United States Patent
Zhang et al.

(10) Patent No.: US 8,197,128 B2
(45) Date of Patent: Jun. 12, 2012

(54) METHOD AND DEVICE FOR TEMPERATURE PREDICTION

(75) Inventors: Bo Zhang, Shenzhen (CN); Pengfei Zuo, Shenzhen (CN); Xianliang He, Shenzhen (CN); Zhonghua Liu, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 874 days.

(21) Appl. No.: 12/269,321

(22) Filed: Nov. 12, 2008

(65) Prior Publication Data

US 2009/0129433 A1 May 21, 2009

(30) Foreign Application Priority Data

Nov. 12, 2007 (CN) .......................... 2007 1 0124527

(51) Int. Cl.
*G01K 3/00* (2006.01)
*G01K 3/08* (2006.01)
*G01K 5/22* (2006.01)
*A61B 5/01* (2006.01)

(52) U.S. Cl. .................... 374/102; 374/163; 702/130

(58) Field of Classification Search ........... 374/102–104
See application file for complete search history.

(56) References Cited

U.S. PATENT DOCUMENTS

| | | | |
|---|---|---|---|
| 4,843,577 A * | 6/1989 | Muramoto | 702/131 |
| 5,015,102 A * | 5/1991 | Yamaguchi | 374/107 |
| 5,259,389 A * | 11/1993 | Muramoto et al. | 600/546 |
| 5,738,441 A * | 4/1998 | Cambridge et al. | 374/102 |
| 6,270,252 B1 * | 8/2001 | Siefert | 374/102 |
| 6,439,768 B1 * | 8/2002 | Wu et al. | 374/169 |
| 6,698,921 B2 * | 3/2004 | Siefert | 374/169 |
| 7,270,476 B2 * | 9/2007 | Tokita et al. | 374/107 |
| 7,637,657 B2 * | 12/2009 | Yamamoto et al. | 374/169 |
| 7,778,791 B2 * | 8/2010 | Nakamura et al. | 702/130 |
| 2006/0224349 A1 * | 10/2006 | Butterfield | 702/130 |

FOREIGN PATENT DOCUMENTS

| | | |
|---|---|---|
| CN | 1584523 A | 2/2005 |
| JP | 60-157031 A | 8/1985 |
| JP | 63009829 A | 1/1988 |

OTHER PUBLICATIONS

International Search Report for Chinese Patent Application No. 200710124527.5.
English Abstract for JP63009829A.
English Abstract for JP60-157031A.
English Abstract for CN1584523A.

* cited by examiner

*Primary Examiner* — Amy Cohen Johnson
(74) *Attorney, Agent, or Firm* — Vista IP Law Group, LLP (57) ABSTRACT

A method and a device for temperature prediction or measurement are disclosed. The method comprises: acquiring temperature data outputted from a thermometer probe; selecting some temperature data within a valid time period from the acquired data; determining a first specific time point according to the slope change rate of the temperature curve within the valid time period and an initial temperature within the valid time period; determining a second specific time point according to the slope at or before the first specific time point; calculating a value of temperature y according to an hyperbolic formula; determining a final temperature of the object according to the maximum slope of the temperature curve in the valid time period, the initial temperature of the temperature curve in the valid time period, and the value of temperature y.

18 Claims, 7 Drawing Sheets

METHOD AND DEVICE FOR TEMPERATURE PREDICTION

CROSS-REFERENCE TO RELATED APPLICATION(S)

This application claims the benefit under Title 35, United States Code, §119(a)-(d) or §365(b) of the Chinese Patent Application No. 200710124527.5 which was filed on Nov. 12, 2007 into State Intellectual Property Office of the People's Republic of China, the content of which is incorporated by reference in its entirety.

FIELD OF THE INVENTION

Various embodiments are related to an electronic thermometer, a temperature prediction or measurement method, and a temperature prediction or measurement device.

BACKGROUND

A typical thermometer commonly used for measuring temperature is the mercury thermometer. However, there are some disadvantages in using such a traditional mercury thermometer. Firstly, using such a traditional thermometer involves reading the scale that the mercury in the glass tube reaches, which may introduce reading error; and secondly, using such a traditional thermometer involves reaching a thermal equilibrium between the body temperature and the thermometer, which may take a long time for the measurement. Various types of electronic thermometers have been developed to address the above disadvantages. These electronic thermometers typically use the following structure: a probe (comprising a thermal element), AD sampling component, a processor for processing data, and a display unit. An electronic thermometer is a predictive thermometer that predicts a stable temperature based on temperature data acquired during a time period by using an algorithm. Today, most predictive thermometers employ a curve fitting method for measuring human body temperatures. As the classical thermal conductance theory generally considers the temperature conductance curve as a logarithmic function, many temperature measurements perform a logarithmic fitting based on a small piece of measured data to determine the final temperature. However, body temperature may vary between different parts of the body. Body temperature also varies with time and between man and woman. A normal human body usually exhibits a relatively stable range but rarely remains constant. Through studies and researches, various embodiments consider that the conductance of human body temperature may be different from an ideal state and may be affected by many other factors so that a simple simulation with logarithm curve may lead to significant errors in the predicted results.

SUMMARY OF THE INVENTION

An object of various embodiments of the invention is to provide a temperature prediction method and device for predicting temperature. The method and device, in various embodiments, adapt to the temperature differences between human bodies and accurately predict the actual body temperature by using a piece of data obtained before a thermal balance between the human body and the probe is reached.

In some embodiments, the method or the device for predicting temperature, comprising at least one of the following processes:
  A1. acquiring temperature data outputted from a thermometer probe. In some embodiments where a contact type thermometer is used, A1 comprises acquiring temperature data outputted from a thermometer probe;
  B1. selecting a portion of the temperature data in a valid time period from the acquired temperature data;
  C1. determining a first specific time point based at least in part upon a rate of change of the slope of the temperature curve in the valid time period and an initial temperature of the temperature curve in the valid time period;
  D1. determining a second specific time point based at least in part on a slope value at or before the first specific time point;
  E1. calculating a value of temperature y according to the following equation: y=(a*t+b)/(t+c), where a, b, and c denote hyperbolic coefficients obtained by performing a curve fitting of the hyperbola y=(a*t+b)/(t+c) based at least in part on the temperature data within the valid time period, and t denotes the time at the second specific time point;
  F1. determining the final temperature of the object based at least in part upon the maximum slope of the temperature curve within the valid time period, the initial temperature of this temperature curve within the valid time period, and the temperature value y.
    wherein the act of selecting the portion of the temperature data in a valid time period of B1 comprises at least one of the following:
  B11. determining one or more the first-order derivatives and the second-order derivatives of the acquired temperature data;
  B12. comparing the one or more first-order derivatives and the second-order derivatives with zero respectively; and
  B13. identifying the valid time period wherein the one or more first-order derivatives of the temperature data is greater than or equal to zero within the valid time period, and the one or more second-order derivatives of the temperature data is less than or equal to zero.

In some other embodiments, the method further comprises a preheating process or action for heating the probe to a predetermined temperature before the process A1, the preheating process or action comprising at least one of the following:
  A11. heating the thermometer probe and acquiring the temperature of the thermometer probe;
  A12. calculating the difference between the current temperature value of the probe and a predetermined temperature;
  A13. determining whether the difference satisfies the accuracy requirement, and if so, performing process A1, otherwise performing process A14; and
  A14. where the absolute value of the difference is smaller than or equal to a first preset value and greater than or equal to a second preset value, adjusting the amount of heating based at least in part upon a control parameter obtained via the equation Error=coef 1*P+coef 2*I+coef 3*D, wherein Error denotes the control parameter, P denotes a term representing the difference between the current temperature value and the predetermined temperature {ECT: QUESTION: are we saying P=|current temperature−predetermined temperature| or P=constant x|current temperature−predetermined temperature|?}, I denotes an integral term representing the integral value of the proportion term with time—

$$\int_{ValidTimeRange} P\,dt,$$

D denotes a term representing the difference between the current term, $P_{current}$, and the pervious term, $P_{previous}$, and coef 1, coef 2, and coef 3 denote some constants; adjusting the amount of heating to 10%~90% of the original amount, wherein the absolute value of the difference is greater than or equal to the first preset value; and fine tuning the amount of heating where the absolute value of the difference is smaller than or equal to the second value.

In some embodiments, the device for predicting temperature comprises some or all of the following:

a probe configured for sensing or measuring a temperature of the object, wherein the probe senses or measures the temperature of the object by contacting the object in some of the embodiments;

a temperature data acquisition unit configured for acquiring temperature data outputted by the probe;

a valid time period selection unit configured for selecting the temperature data within the valid time period from the temperature data acquired;

a curve fitting unit configured for performing a curve fitting based at least in part on the temperature data within the valid time period, wherein the curve fitting unit performs a curve fitting with a hyperbolic equation of $y=(a*t+b)/(t+c)$ within the valid time period to determine the coefficients a, b, and c, where t denotes the time in some of the embodiments;

a first specific time point determining unit configured for determining a first specific time point based at least in part upon the rate of change of the slope of the temperature curve within the valid time period and an initial temperature of the temperature curve within the valid time period;

a second specific time point determining unit configured for determining a second specific time point based at least in part on the slope at or before the first specific time point;

a first calculating unit configured for calculating a temperature y according to the equation of $y=(a*t+b)/(t+c)$, where a, b, and c denote hyperbolic coefficients, and t denotes the time a value at the second specific time point; and a second calculating unit configured for determining the final temperature of the object based at least in part upon the maximum slope of the temperature curve within the valid time period, the initial temperature within the valid time period, and the value of y, where the final temperature constitutes the equilibrium temperature of the object during a period of time of interest, wherein the valid time period selection unit, the curve fitting unit, the first specific time point determining unit, the second specific time point determining unit, the first calculating unit, and the second calculating unit may be configured to jointly comprise one or more components such as a general or special purpose processor or an integrated circuit chip. In some embodiments, the general purpose processor comprises a central processing unit (CPU). In some embodiments, the special processor comprises an application specific integrated circuit (ASIC). In various embodiments, the one or more components comprise a hardware such as an electronic circuitry, software, or a combination of software and hardware.

In some embodiments, the valid time period selection unit comprises at least one of the following:

a derivation module configured for calculating one or more first-order derivatives and one or more second-order derivatives of the acquired temperature data; and a first comparison module configured for comparing the obtained first-order derivatives and the second-order derivatives with zero respectively, and identifying the valid time period wherein the one or more first-order derivatives of the temperature data is greater than or equal to zero within the valid time period, and the one or more second-order derivatives of the temperature data is less than or equal to zero, wherein a derivation module and a first comparison module may be configured to jointly comprise one or more components such as one or more processors or one or more integrated circuit chips.

In another embodiment, the method or device for predicting or measuring temperatures further comprises a preheating unit for heating the probe to a predetermined temperature, the preheating unit comprising at least one of the following components:

a heating element configured for heating the probe;

an error calculating module configured for calculating a difference between a current temperature value acquired and the predetermined temperature;

a second comparison module configured for determining whether the difference meets the accuracy requirement; and a temperature control module configured for adjusting the amount of heat for heating the probe based at least in part on the result of the second comparison module to control the temperature of the probe to reach the predetermined temperature, the adjusting comprises:

where the absolute value of the difference is smaller than or equal to a first preset value and greater than or equal to a second preset value, adjusting the amount of heating based at least in part upon a control parameter obtained via the equation of Error=coef 1*P+coef 2*I+coef 3*D, wherein Error denotes the control parameter, P denotes a term representing the difference between the current temperature value and the predetermined temperature, I denotes an integral term representing the integral value of the term P with time—

$$\int_{ValidTimeRange} P\,dt,$$

D denotes a term representing the difference between the current term $P_{current}$ and the pervious proportion term, $P_{previous}$, and coef 1, coef 2, and coef 3 denote some constants; adjusting the amount of heating to 10%~90% of the original amount where the absolute value of the difference is greater than or equal to the first preset value; and fine tuning the amount of heating where the absolute value of the difference is smaller than or equal to the second value.

The advantageous effects of various embodiments comprise:

1) In some embodiments, the method or the device predicts the final temperature of an object by performing a hyperbolic curve fitting on the temperature data acquired based at least in part on a small piece of data acquired. During the prediction process, a time point relating to the object is determined based at least in part on the circumstances in which the measurement is being taken, the time point may then be utilized to determine a temperature y representing a temperature of the object matching the hyperbolic curve, which is used to determine the final temperature of the object. In some embodiments, the method or the device for predicting or measuring temperature takes into account different thermal conductivities in various situations as well as the differences between objects.

2) In some embodiments, the method or the device for predicting or measuring temperature is not susceptible to interferences to the measurement, such as interferences from the environment or from signal processing, by using the one or more first-order derivatives and the one or more second-order derivatives to verify validity of the acquired temperature data and to remove or filter unsuitable data. In some embodiments, the method or the device for predicting or measuring temperature produces more accurate measurement or prediction results by using the one or more first-order derivatives and the one or more second-order derivatives to verify validity of the acquired temperature data and to remove or filter unsuitable data.

3) In some embodiments where it may be necessary or desirable for the probe to absorb as little heat as possible from the object for the temperature prediction or measurement, the probe may be preheated before the measurement. Depending on the difference between a current temperature of the probe and a predetermined temperature, some embodiments use different heating control processes to preheat the probe to a predetermined temperature.

DETAILED DESCRIPTION

Various features and advantages of various embodiments will be described in detail below by means of the illustrative embodiments and/or examples with reference to the drawings. These embodiments are for illustrative and explanatory purposes and do not intend to limit the scope of various embodiments as such. One of ordinary skills in the art will clearly understand that other embodiments or modification of some of the processes, actions, or modules of any of the embodiments below are possible while falling completely within the scope of various embodiments of the invention.

Figure 1:
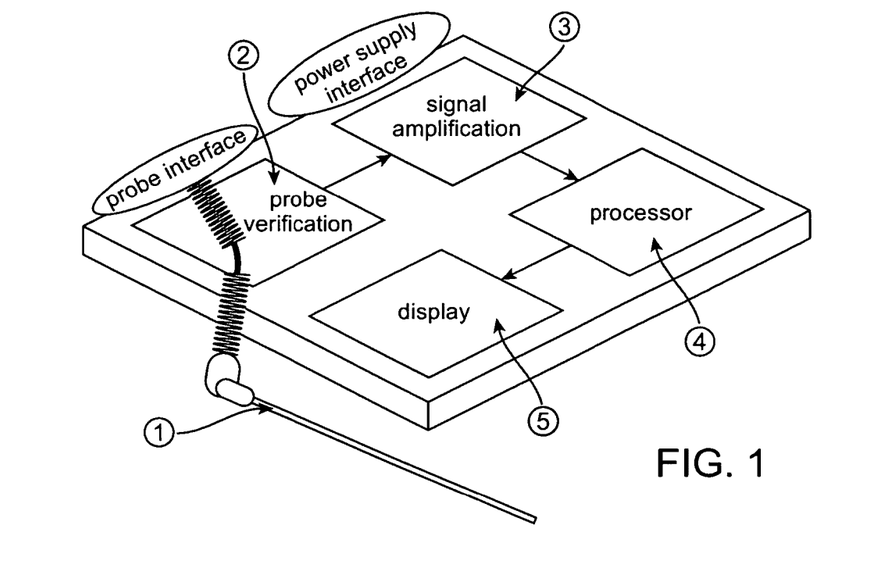
FIG. 1 illustrates a simplified block diagram of an electronic thermometer.

FIG. 1 shows the basic components of an exemplary predictive thermometer, which usually comprise five components: a probe 1, a probe verification module 2, an amplification circuit 3, a CPU 4 (which may comprise AD sampling module), and a display module 5.

In some embodiments, the probe 1 comprises a thermal resistor for exchanging heat with the object to be measured. While the exemplary predictive thermometer is in use, the probe may be inserted into a disposable sheath and placed at or near the target location (e.g. the mouth, armpit; or the back or rectum of a newborn baby) for a period of time until the prediction process completes.

In some embodiments, since the prediction process may be closely related with the stricture of the probe, the exemplary predictive thermometer may optionally comprise a probe verification module 2 to prevent an unqualified probe from affecting the accuracy of the process or even damaging the circuit. In some embodiments, the probe verification module 2 may not be included.

In some embodiments, the exemplary predictive thermometer causes the signals to be amplified, sampled, and inputted to a processor for performing the prediction process, and the result obtained may be outputted to the display module 5.

Embodiment 1

Figure 2:
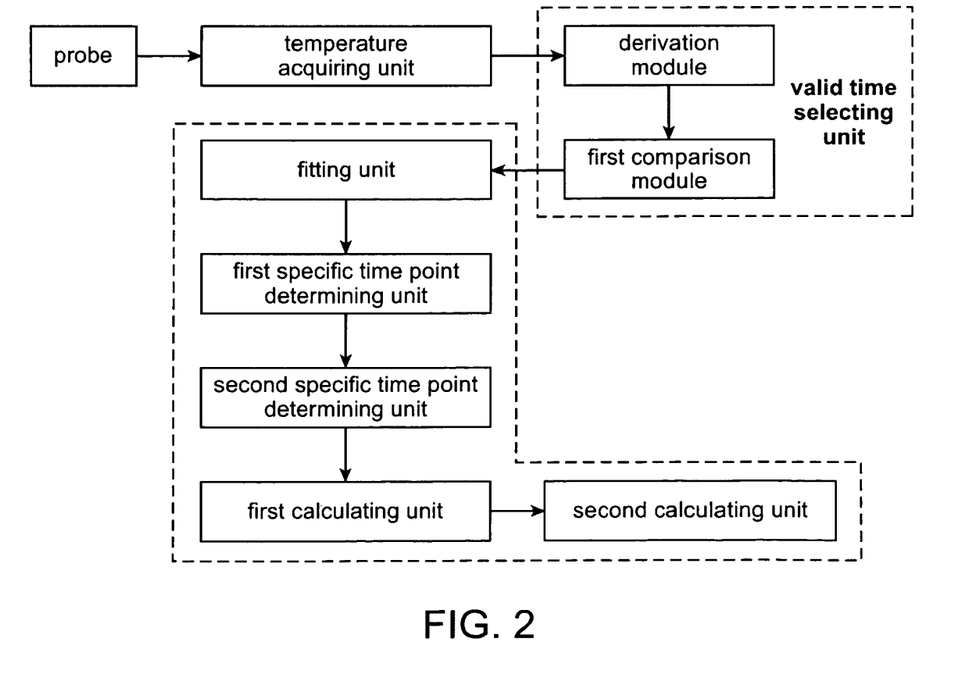
FIG. 2 illustrates a structural schematic diagram according to an embodiment of the present invention.

Another exemplary device for temperature prediction in this embodiment is shown in FIG. 2, which comprises a probe sensing its temperature, a temperature data acquisition unit, a valid time period selection unit, a curve fitting unit, a first specific tune point determining unit, a second specific time point determining unit, a first calculating unit, and a second calculating unit. In some embodiments, the valid time period selection unit, the curve fitting unit, the first specific time point determining unit, the second specific time point determining unit, the first calculating unit, and the second calculating unit may be configured to jointly comprise one or more components such as a processor or an integrated circuit chip. The temperature data acquisition unit may be configured for acquiring temperature data outputted by the probe. The valid time selecting unit may be configured for selecting a portion of the temperature data from the acquired temperature data within a valid time period. The valid time period selection unit may comprise a derivation module and a first comparison module.

The curve fitting unit may be configured for performing curve fitting of the temperature data with a hyperbolic equation $y=(a*t+b)/(t+c)$ within the valid time to obtain the hyperbolic coefficients a, b, and c, where t denotes the time. The first specific time point determining unit may be configured for determining the first specific time point based at least in part upon a rate of change of the slope of the temperature curve within the valid time period and an initial temperature within the valid time period. The second specific time determining unit may be configured for determining a second specific time point based at least in part on the slope at or prior to the first specific time point. The first calculating unit may be configured for calculating the value of the temperature y which represents the temperature of the object matching the hyperbola. The second calculating unit may be configured for determining the final temperature of the object based at least in part upon the maximum slope of the temperature curve within the valid time period, the initial temperature of this temperature curve in the valid time period, and the value of the temperature y.

Figure 3:
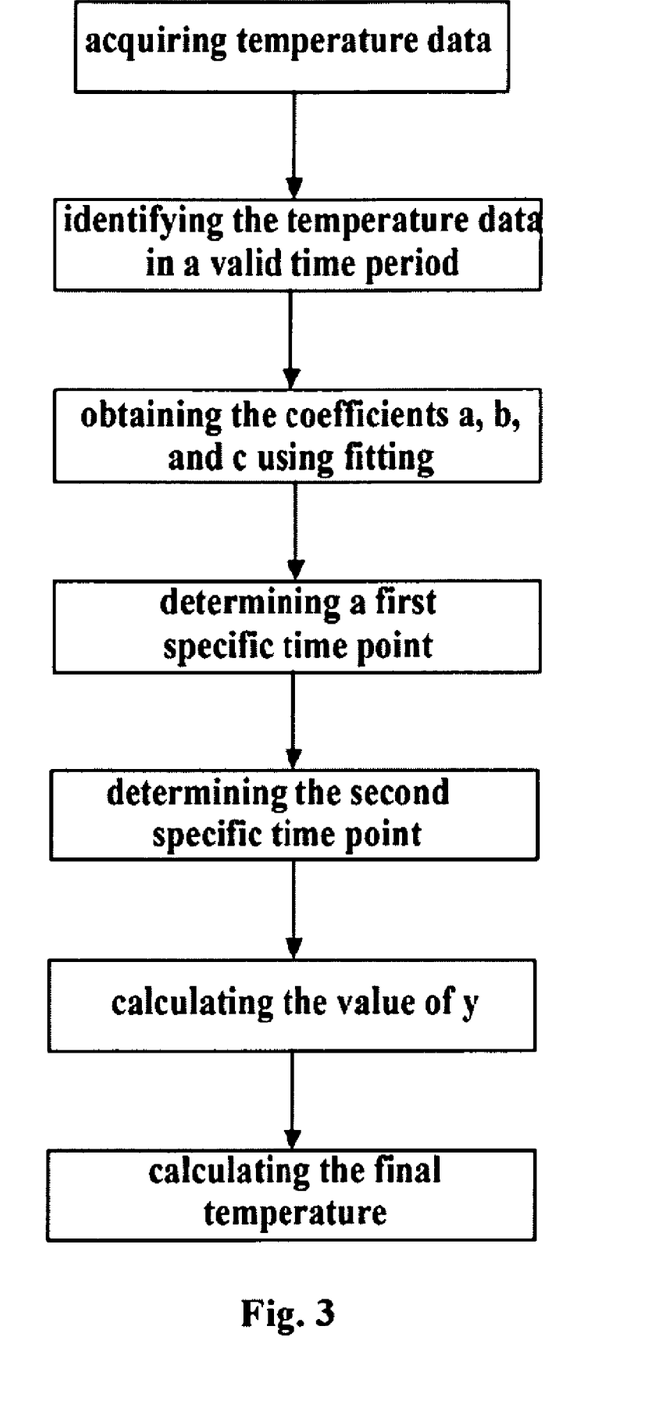
FIG. 3 shows a flow chart according to an embodiment of the present invention.

In order to measure the temperature, a user, in some embodiments, takes the probe out of the probe sheath, turns on the switch to enter the measuring or prediction process. Referring to FIG. 3, the temperature prediction or measurement process comprises at least one of the following:

1. Sensing the temperature of the object, and converts the temperature into one or more electrical signal such as a voltage or a current signal for output. The temperature data acquisition unit acquires the temperature data output from the probe.

2. Selecting the temperature data within a valid time period from the acquired temperature data. In some embodiments, since temperature prediction process measures or predicts the final temperature of the object based on the acquired temperature data within a short period of time through a certain process, it may not be unnecessary to acquire the temperature data in a long period of time. However, there may exist some circumstances where not all temperature data acquired are suitable for temperature prediction. In some embodiments, it may be necessary or desirable for the acquired temperature data to meet some conditions to be deemed valid, and the temperature prediction process may start after the method or the device decides that the temperature data within a selected time period meet these conditions. In these embodiments, the validity of temperature data may be determined by the first comparison module based on the change of the first and second derivatives of the temperature curve obtained by the derivation module. If, during the specified algorithm time, the data sequence satisfies the condition that all the first-order derivatives are greater than or equal to zero, and all the second-order derivatives are smaller or equal to than zero, the data sequence in that time period is considered as valid, and the data in that period of time are considered to be the temperature data within a valid time period, based at least in part on which the following processes are performed.

Figure 4:
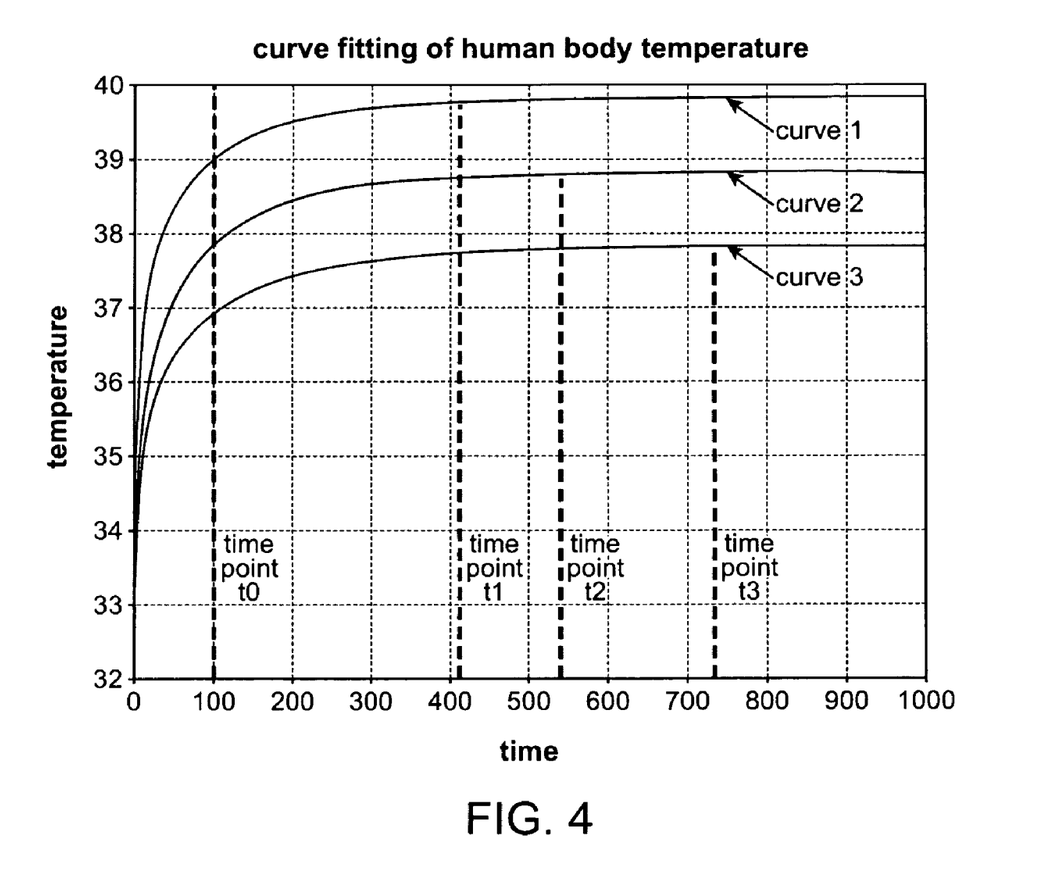
FIG. 4 illustrates an illustration showing the curve fitting.

3. FIG. 4 shows temperature data curves acquired by device in sensing the temperature of an object. The first portion of the curves meets or may be approximated by the following equation:

$$y=(a*t+b)/(t+c) \quad (1)$$

Where a, b, and c denote coefficients, and t denotes the time.

The hyperbolic curve may be fitted based at least in part on the temperature data within that period of time, and the coefficients a, b, and c may be obtained. In some embodiments, the least square method may be used in the curve fitting process.

Due to the nature of the object itself, when the temperature increases to a certain point, it may no longer follow the hyperbolic curve in some embodiments. Therefore, in the prediction of the final temperature, the value t may not be taken excessively large but as a value relevant to the thermal conductivity of the object. The influence of the thermal conductivity on the value of t may be derived from the curve within the valid time period at or before a specific time point during the initial rising phase of the curve. So, it is necessary or desirable to find the specific time point in these embodiments.

4. Determining the specific time point to based at least in part upon a rate of change of the slope of the temperature curve within the valid time period and an initial temperature of the temperature curve within the valid time period. The first specific time point t0 is determined according to the rate of change of the slope of the temperature curve and the initial temperature in some embodiments. Assuming the slope value is slope(t), the initial temperature is T0, the threshold is threshold, then the first specific time point t0 may be determined according to the following equation:

$$\text{coef }4*\text{slope}(t0)+\text{coef }5*T0=\text{threshold} \quad (2)$$

Where coef 4, coef 5 denote some empirical coefficients and threshold denotes an empirical constant in some embodiments. In some embodiments, the value of coef 4 comprises a range of 74.0±20, the value of coef 5 comprises a range of 1.0±0.3, and the value of threshold comprises a range 56±15.

The slope value slope(t) may be calculated by the ratio of the difference between two adjacent samples to their time interval in some embodiments. In this way, a set of slopes corresponding to various sampling times may be obtained. In some embodiments, slope(t0) denotes the slope corresponding to the first specific time point t0.

Given the initial temperature T0, coef 4, coef 5, and threshold, slope(t0) may be determined from equation 2 above, and the time corresponding to the slope may be found via a lookup table in some embodiments. In some embodiments, the time corresponding to the slope comprises the first specific time t0.

5. After the first specific time point t0 is determined, the second specific time point t0' may be determined based at least in part on a slope at or before the first specific time point t0 in some embodiments. In some embodiments, the second specific time point t0' may be determined based at least in part on the slope 2 or 3 seconds before the first specific time point to according to the following equation:

$$t0'=\text{coef }6*\text{slope}(t0-2) \quad (3)$$

Where coef 6 denotes an empirical parameter, slope(t0−2) denotes the slope 2 seconds before the first specific time point t0. In some embodiments, coef 6 comprises a range of values of 205±5.

t0' may be expressed as a function of the shape of the curve in some embodiments. As shown in FIG. 4, the values of t0' corresponding to the three curves are t1, t2, t3 respectively in some embodiments.

6. Calculating the value of the temperature y according to the equation: y=(a*t+b)/(t+c), wherein a, b, and c denote the coefficients determined at process 3, and t denotes the value of the second specific time point t0' in some embodiments. The value of y indicates the temperature in which the human body temperature matches the change of the hyperbolic curve in some embodiments.

7. Determining the final temperature of the object based at least in part upon the maximum slope of the temperature curve within the valid time period, an initial temperature of the temperature curve within the valid time period, and the value of the temperature y in some embodiments. In some embodiments, the relation between the final temperature z and the value y may be linear or quasi-linear to some extent. In some embodiments, multiple sets of the coefficients may be derived based at least in part upon the classification by the initial temperature t0 and the maximum slope slopeMax, and the coefficients e[i][j], d[i][j] (which vary depending on the structure of the probe) determined via a lookup table, a database, or other similar data structures are introduced into the equation:

$$z=e[i][j]*y+d[i][j] \quad (4)$$

z denotes the final temperature of the object.

When using the same probe to measure the body temperature of different objects at the same temperature, the results may vary due to some factors such as the skin dryness, etc. Such information may be hidden in the early portion of the temperature curve and may interfere with the measurement or prediction process. To reduce or eliminate the interferences, some embodiments comprise the following processes in some embodiments: identifying a first specific time point to related to the object, identifying a second specific time point t0' related to the object based at least in part on the first specific time point t0, determining the temperature y and the final temperature z. In these embodiments, the temperature value determined may not be based on an ideal state but is related to different objects or different measuring conditions such that the predicted result may be closer to the real temperature of the object.

To ensure more accuracy of the result, some embodiments further apply different coefficients to different initial temperatures t0 and different maximum slopes slopeMax of the temperature curve within the valid time period in some embodiments, where the different coefficients represents different object information.

In the processes described above, the method may comprise an order of calculating the hyperbolic coefficients a, b, and c, the first specific time point to, and the second specific time point t0' in some embodiments. However, these coefficients and time points may be determined in a different order, for example, calculating the first specific time point t0 and the second specific time point t0' first, and then calculating the hyperbolic curve coefficients a, b, and c in some embodiments.

In determining the first specific time point t0, the second specific time point t0', and the final temperature z of the object, in addition to using the equations (2), (3), and/or (4), high-order curve fitting may also be employed in some embodiments. For example, where it is determined that the result may not be satisfactory using a first-order curve $Y=a*x+b$, a second-order curve $Y=a*x^2+b*x+c$ may be used, and so on, until the best fit is found. Various types of curve fitting methodologies may be used depending on the specific data statistics or circumstances.

Embodiment 2

Figure 5:
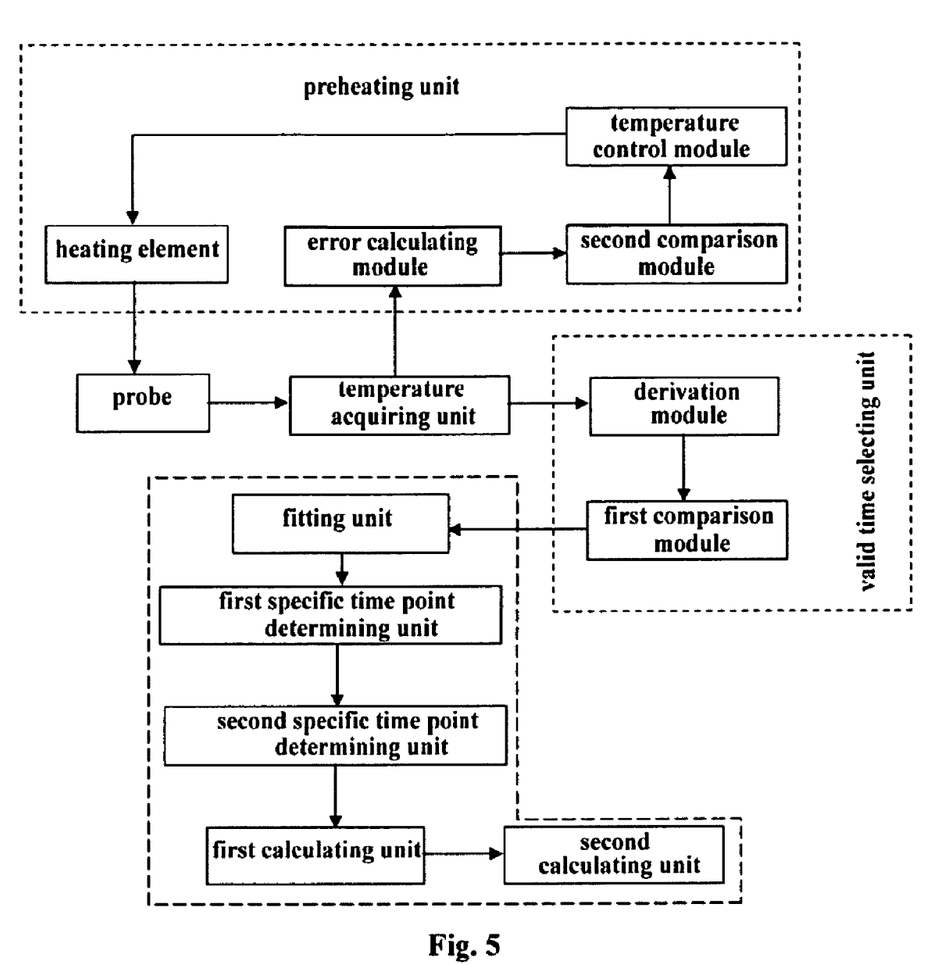
FIG. 5 shows a structural schematic diagram according to another embodiment of the present invention.

In some embodiments, in order to quickly measure or predict the temperature of an object (such as the human body), it may be necessary or desirable for most heat of the human body to be directed towards the probe so that the temperature rising curve produced by a contact between the probe and the human body falls into the area of interest for the prediction process in some embodiments. In these embodiments, a preheating unit may be optionally employed in the temperature prediction device in these embodiments as shown in FIG. 5. The preheating unit comprises at least some of a heating element, an error calculating module, a second comparison module, and a temperature control module in some embodiments. In some embodiments the error calculating module, the second comparison module, and the temperature control module may be configured to jointly comprise one or more components such as a processor or an integrated circuit chip. The heating element may be configured to be disposed closely in contact with the thermal resistor in some embodiments. In use, the heating element may be a heating resistor that heats the probe in some embodiments. The error calculating module may be configured for calculating the difference between the current temperature value and the predetermined temperature based on the temperature value of the probe acquired by the acquiring unit in some embodiments. The second comparison module may be configured for determining whether the difference meets the accuracy requirement through comparison. The temperature control module may be configured for adjusting the amount of heating for the probe based at least in part on the result of the second comparison module so as to control the temperature of the probe to reach the predetermined temperature in some embodiments.

Figure 6:
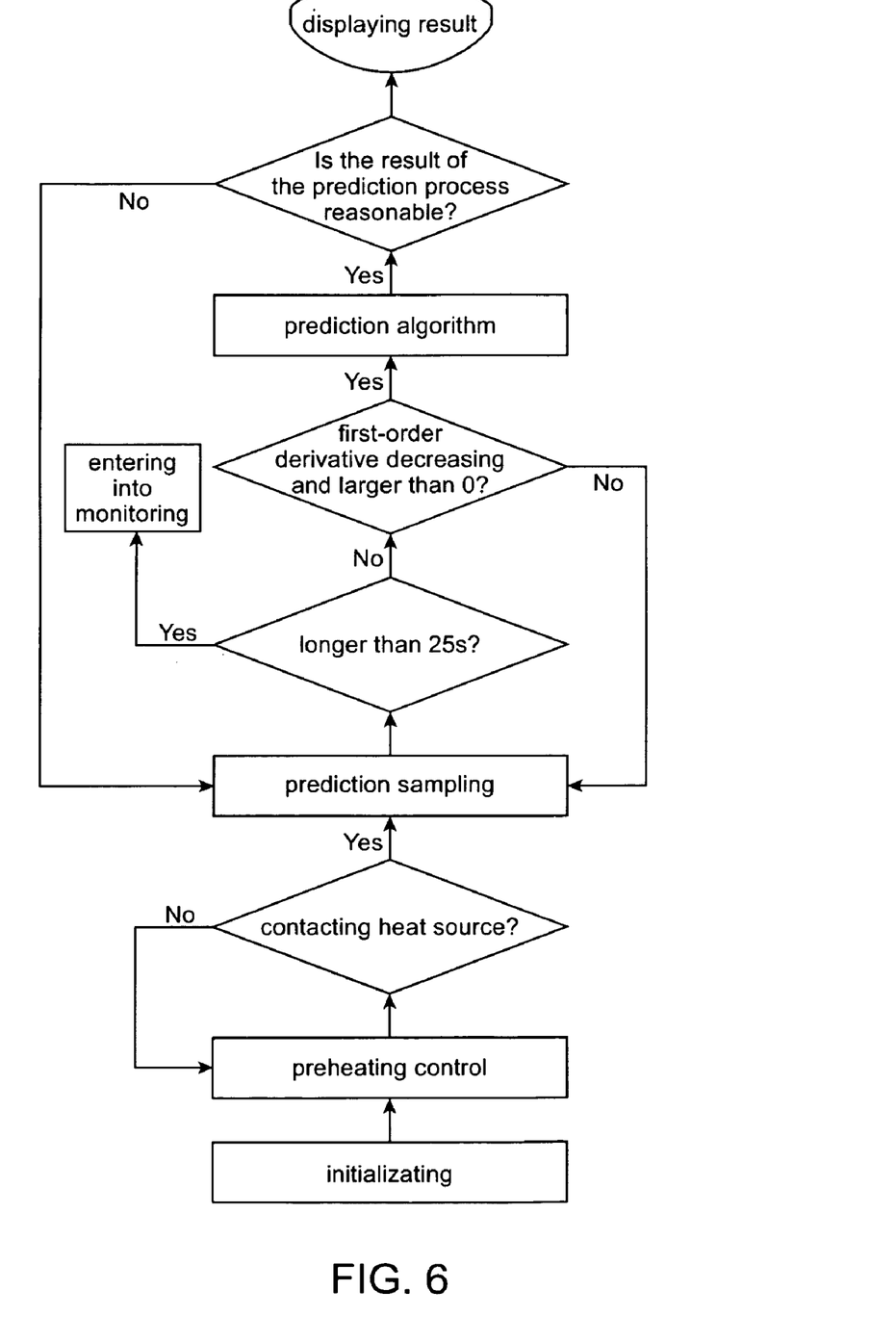
FIG. 6 shows a flow chart according to another embodiment of the present invention.

FIG. 6 shows the operational flow of some embodiments with the optional addition of the preheating process. The operational flow starts with an initialization process or action which is followed by a preheating process or action. During the preheating process or action, the probe may be preheated to a fixed temperature close to human body temperature (e.g. 32.5° C.) so that the probe absorbs as little heat as possible from the human body in a non-sensitive phase of the process.

The probe begins to acquire temperature data after meeting the heat source such as coming into direct contact or within a range from the object in some embodiments. A determination is made as to whether the measurement time may be longer than a preset time (e.g. 25 seconds) in some embodiments. If it is found in some embodiments that the measurement time may be longer than the preset time, the measurement time has been relatively long. If no result is obtained at this point, the measuring or prediction process may stop, a monitoring process will be invoked, and the acquired temperature data may be shown in some embodiments. If it is found that the measurement time is shorter than the preset time, a determination of when to start the prediction or measurement process may be made based at least in part upon the changes in the first and second-order derivatives of the temperature curve in some embodiments. If the data sequence during a specified process time (e.g. 8 s) satisfies the condition that all or most of the first-order derivatives are greater than or equal to zero, and all or most of the second-order derivatives are smaller than or equal to zero, the data sequence may be considered valid, and the prediction or measurement process starts in some embodiments.

The prediction or measurement method may be the same as what Embodiment 1 comprises in some embodiments. After the final temperature is obtained, a determination may be made as to whether the final temperature is reasonable. If the determination is affirmative, the predicted result may be shown through the display module in some embodiments; if the determination is negative, the process may return to the temperature data collecting process or action for another prediction or measurement provided that the measuring time has not exceed the preset time (e.g. 25 seconds) in some embodiments.

Figure 7:
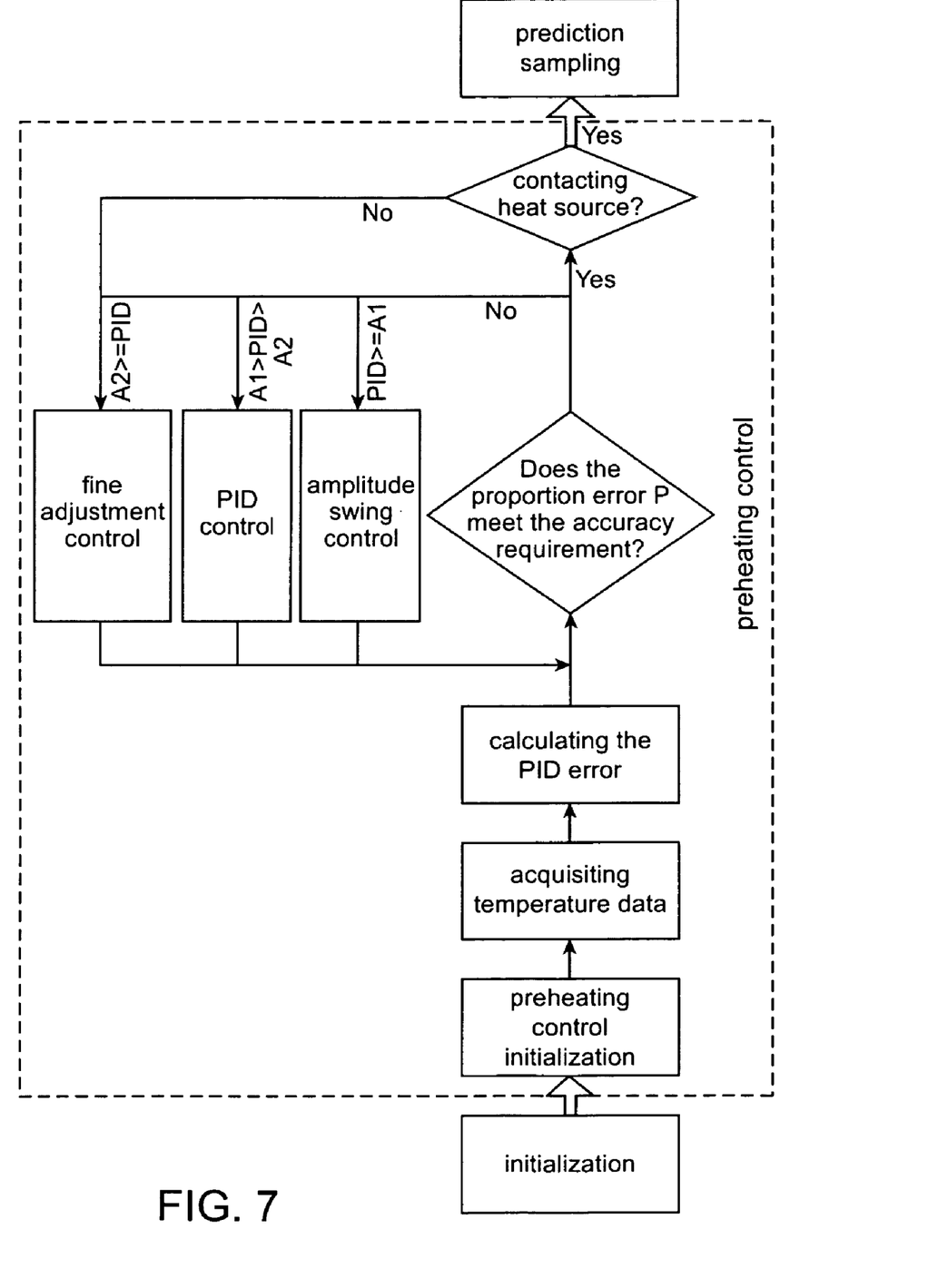
FIG. 7 illustrates a flow chart showing the preheating algorithm according to another embodiment of the present invention.

FIG. 7 shows the operational now of the preheating control procedure. The operational flow starts with an initialization process or action in some embodiments. After that, the probe may be pre-heated in some embodiments. The acquisition unit acquires the temperature sensed by the probe, compares a current temperature with a predetermined preheating target temperature (i.e. the predetermined temperature) to determine the difference PID (proportional integral derivative)—the current temperature sensed by the probe—the predetermined temperature, and determines whether the difference PID meets an accuracy requirement. If the difference PID meets the accuracy requirement, the probe may start to acquire the temperature data for predicting or measuring the final temperature after it contacts or comes into the position relative to the object to be measured; if the difference PID does not meet the accuracy requirement, a feedback control may be performed to change the amount of heating, and thus controlling the rate of change of the probe temperature in some embodiments. Depending on the value of the difference in the feedback control, three different control methods are employed in some embodiments.

1. PID control. This method applies where the absolute value or the difference is smaller than or equal to a first preset value A1 and greater than or equal to a second preset value A2 in some embodiments, where A1 and A2 may be determined based at least in part upon the actual needs or the circumstances of the measurement or prediction. In these embodiments, the control parameter may be determined according to the following equation:

$$\text{Error} = \text{coef} 1 * P + \text{coef} 2 * I + \text{coef} 3 * D \quad (5)$$

wherein, Error denotes the control parameter, P denotes a proportion term representing the difference between the current temperature and the predetermined temperature, I denotes an integral term representing the integral value of the proportion term with time, $$\int_{ValidTimeRange} P\,dt,$$

D denotes a derivative term representing the difference between a current proportion term, $P_{current}$, and its previous proportion term, $P_{previous}$ and coef 1, coef 2, and coef 3 denote some empirical constants. In some embodiments, the value of coef 1 comprises a range of 3.8±1.1 in some embodiments, the value of coef 2 comprises a range of 0.004±0.001 in some embodiments, and the value of coeds comprises a range of 0.95±0.3 in some embodiments.

The amount of heating may be adjusted based at least in part on the control parameter, such as PWM=0.5*Error in some embodiments. This control method is commonly called a PID control.

2. Amplitude swing control. This method may be applied to embodiments where the absolute value of the difference is larger than or equal to the first preset value A1, i.e. a rather large dithering amplitude. In these embodiments, the amount of heat may be reduced to 10%-90% of its amount to accelerate the convergence speed, which indicates the amount of time required for the oscillating or fluctuating temperature to become steady at a predetermined temperature value.

3. Fine tuning control. This method may be applied to embodiments where the absolute value of the difference is smaller than or equal to the second preset value A2, i.e. a small dithering amplitude. In these embodiments, a step-by-step fine adjustment may be employed to overcome the inherent fluctuation of PID in some embodiments.

While the prior art generally employs only the PID control, the preheating feedback control in some embodiments adds nonlinear processing capabilities to the existing PID control and thus makes the preheating more efficient and more stable in some embodiments.

Figure 8:
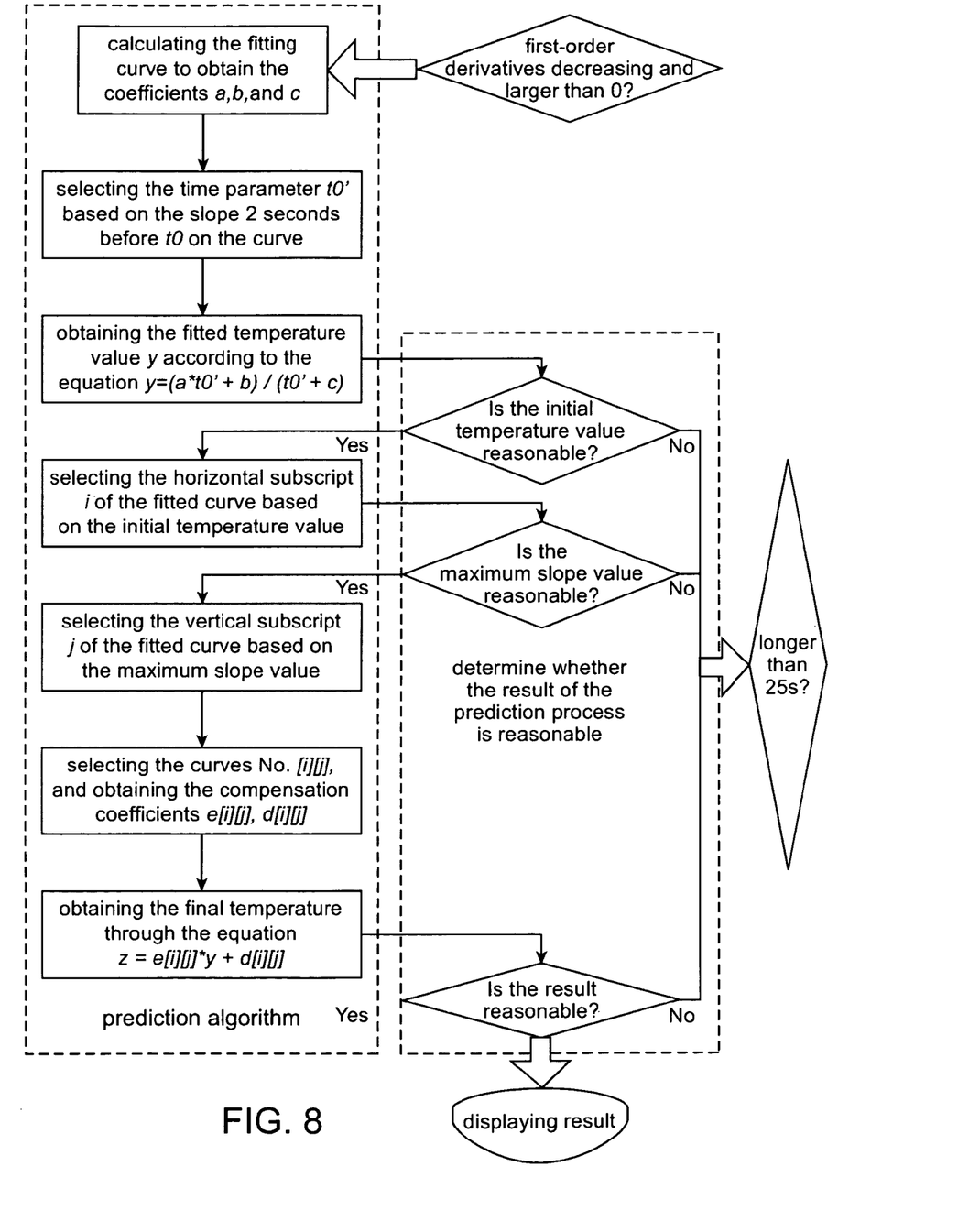
FIG. 8 illustrates a flow chart showing the prediction algorithm according to another embodiment of the present invention.

The prediction process indicated in FIG. 6 may be identical to what Embodiment 1 comprises in some embodiments. The detailed flow is as shown in FIG. 8 and comprises at least some of the following processes or actions:

1. Determining or identifying a hyperbolic curve by utilizing the temperature data in the valid time period (e.g. 8 seconds) to obtain the coefficients a, b, and c in some embodiments. The hyperbolic curve may be expressed in the following equation:

$$y=(a*t+b)(t+c)$$

Where a, b, and c are coefficients, and t is the time.

2. Determining a first specific time point to based at least in part upon a rate of change of the slope of the temperature curve within the valid time period and an initial temperature of the temperature curve within the valid time period, and determining a second specific time point t0' based at least in part on the slope at a certain time (e.g. 2 seconds) before the first specific time point t0 in some embodiments.

3. Calculating the value of the temperature y according to the equation y=(a*t0'+b)/(t0'+c).

4. Determining whether or not the initial temperature value T0 of the temperature curve is reasonable. If the initial temperature value is determined to be reasonable, control flow goes to process or action 5; if the initial temperature value is determined not to be reasonable, the method may determine whether the measurement time exceeds a preset time (e.g. 25 seconds) in some embodiments. If the measuring time exceeds the preset time, then the control flow may invoke the monitoring procedure in some embodiments.

5. Selecting the horizontal subscript (abscissa subscript) i of the fitting hyperbolic curve based at least in part on the initial temperature value T0 the maximum slope of the temperature curve is determined to be reasonable.

6. Determining whether or not the maximum slope of the temperature curve within the valid time period is reasonable. If the maximum slope of the temperature curve is determined to be reasonable, the control flow may proceed to process or action 7; if the maximum slope of the temperature curve is determined not to be reasonable, the method may determine whether or not the measurement time exceeds a preset time, and if the measuring time exceeds the preset time, the control flow may invoke the monitoring procedure in some embodiments.

7. Selecting the vertical subscript (ordinate subscript) j of the curve fitting hyperbolic curve based at least in part on the maximum slope value of the temperature curve within the valid time period the maximum slope of the temperature curve is determined to be reasonable.

8. Looking up a table, a database, or other types of data structure, to determine the compensation coefficients e[i][j], d[i][j the maximum slope of the temperature curve is determined to be reasonable].

9. Introducing the compensation coefficients e[i][j], d[i][j] into the equation:

$$z=e[i][j]*y+d[i][j]$$

wherein z denotes the final temperature of the object.

10. Deciding whether or not the final temperature is reasonable iii some embodiments. If the final temperature is determined to be reasonable, then the predicted result may be displayed; if the final temperature is determined not to be reasonable, the method may determine whether or not the measuring time exceeds a preset time, and if the measuring time exceeds the preset time, the control flow may invoke the monitoring procedure in some embodiments.

In summary, the temperature prediction or measurement method in various embodiments is accurate, interference-resistant, fast, and efficient. Except for being used for measuring human body temperature, the present invention may also be applied to other fields that require a quick measurement, such as the industry control. In various embodiments, the device for measuring or predicting temperature may comprise device that come in direct contact with the object of interest or other types of non-contact devices that may accomplish the intended purposes without directly contacting the object of interest.

The foregoing detailed description of present invention is provided with reference to specific preferred embodiments, but it is not intended to limit the present invention thereto. Persons skilled in the art will recognize that various derivations or substitutions may be made without departing from the spirit of the present invention and the scope of the appended claims.

The aforementioned embodiments are described for the ease of illustration and explanation but do not intend to and shall not be construed to limit the scope of various embodiments. Modification and substitution may also be made by one of ordinary skill in the art without departing from the spirit or scope of the invention, which should still be deemed to be within the scope as set forth by the claims. Other aspects and features of the invention will be evident from reading the following detailed description of the preferred embodiments, which are intended to illustrate, not limit, the invention. Although particular embodiments of the present inventions have been shown and described, it will be understood that it is not intended to limit the present inventions to the preferred embodiments, and it will be obvious to those skilled in the art that various changes and modifications may be made without departing from the spirit and scope of the present inventions. The specification and drawings are, accordingly, to be regarded in an illustrative rather than restrictive sense. Various embodiments are intended to cover alternatives, modifications, and equivalents, which may be included within the spirit and scope of the present inventions as defined by the claims.

We claim:

1. A method for measuring or predicting temperature, the method comprising:
   A1. acquiring temperature data outputted from a thermometer probe;
   B1. selecting a portion of the temperature data from the temperature data within a valid time period;
   C1. determining a first specific time point based at least in part upon a rate of change of a slope of a curve for the portion of temperature data within the valid time period and an initial temperature within the valid time period;
   D1. determining a second specific time point based at least in part on the slope at or before the first specific time point;
   E1. determining a temperature value y according to a hyperbolic formula; and
   F1. determining a final temperature at a point of interest of the object based at least in part upon a maximum slope of the curve within the valid time period, the initial temperature within the valid time period, and the temperature value y.

2. The method of claim 1, in which the act of selecting the portion of the temperature data within the valid time period comprises at least one:
   B11. determining one or more first-order derivatives and one or more second-order derivatives or the temperature data;
   B12. comparing the one or more first-order derivatives and the one or more second-order derivatives with a first value respectively; and
   B13. identifying the valid time period during which at least a first number of the one or more first-order derivatives is greater than or equal to the first value, and at least a second number of the one more second-order derivatives is smaller than or equal to the first value.

3. The method of claim 2, in which the first value comprises a numeric value of zero.

4. The method of claim 1, in which the first specific time point is obtained by using a second formula which is defined as:

$$\text{coef } 4 * \text{slope}(t0) + \text{coef } 5 * T0 = \text{threshold},$$

where coef 4, coef 5, and threshold represent one or more empirical coefficients, T0 represents the initial temperature within the valid time period, slope represents the slope of the curve within the valid time period, t0 represents the first specific time point, and slope(t0) represents a value of the slope at the first specific time point t0.

5. The method of claim 1, in which the second specific time point is determined by using a third formula which is defined as:

$$t = \text{coef } 6 * \text{slope}(t0 - A),$$

where coef 6 represents a second empirical coefficient, slope represents the slope of the curve within the valid time period, t0 represents the first specific time point, and slope(t0−A) represents a value of the slope at a time point which is a first period of time before the first specific time point t0.

6. The method of claim 1, in which the final temperature z is determined by using a fourth formula which is defined as:

$$z = e[i][j] * y + d[i][j],$$

where z represents the final temperature, and e[i][j] and d[i][j] represent one or more coefficients determined using a data structure based at least in part upon the initial temperature and the maximum slope.

7. The method of claim 1, further comprising:
   preheating the thermometer probe to a predetermined temperature before the act of acquiring the temperature data, in which the act of preheating comprising at least some of:
   A11. heating the thermometer probe and acquiring a temperature value from the thermometer probe;
   A12. calculating a difference between a current temperature value from the thermometer probe and a predetermined temperature value;
   A13. performing the act of acquiring the temperature data where the difference is determined to meet an accuracy requirement; and
   A14. where the difference is determined not to meet the accuracy requirement, and where an absolute value of the difference is smaller than or equal to a first preset value and greater than or equal to a second preset value, performing one or more of:
      adjusting an amount of heating based at least in part upon a control parameter obtained via a fourth formula;
      adjusting the amount of heating to 10%~90% of an original amount, when the absolute value of the difference is greater than or equal to the first preset value; or
      fine tuning the amount of heating where the absolute value of the difference is smaller than or equal to the second preset value.

8. The method of claim 7, in which the first preset value comprises 0.6° C., and the second preset value comprises 0.3° C.

9. The method of claim 7, in which the fourth formula is defined as:

$$\text{Error} = \text{coef } 1 * P + \text{coef } 2 * I + \text{coef } 3 * D, \text{ where}$$

Error comprises a control parameter,
P comprises a proportion term representing the difference between the current temperature value and the predetermined temperature,
I comprises an integral term representing an integral of the proportion term P over a period of time, and
D comprises a term representing a first difference between a current proportion term and a pervious proportion term, and coef 1, coef 2, and coef 3 respectively comprise one or more empirical constants.

10. The method of claim 1, in which the hyperbolic formula is expressed as y=(a*t+b)/(t+c), where a, b, and c represent one or more hyperbolic coefficients determined by performing a curve fitting of the portion of the temperature with a hyperbola y=(a*t+b)/(t+c), and t represents a time value taken at the second specific time point.

11. A device for measuring or predicting temperature at a point of interest on or in an object, comprising:

a probe configured for sensing temperature of the object;

a temperature data acquiring unit configured for acquiring or receiving temperature data from the probe;

a valid time selection unit of one or more processing modules configured for selecting a portion of the temperature data within a valid time period from the temperature data;

a curve fitting unit of the one or more processing modules configured for performing a curve fitting on the portion of the temperature data using a first formula;

a first specific time point determining unit of the one or more processing modules configured for determining a first specific time point based at least in part upon a rate of change of a slope of a temperature curve for the portion of temperature data within the valid time period and an initial temperature within the valid time period;

a second specific time point determining unit of the one or more processing modules configured for determining a second specific time point based at least in part on a value of the slope at or before the first specific time point;

a first calculating unit of the one or more processing modules configured for calculating a temperature y based at least in part upon a second formula; and a second calculating unit of the one or more processing modules configured for determining a final temperature at the point of interest on or in the object based at least in part upon a maximum slope of the temperature curve within the valid time period, the initial temperature of the temperature curve, and the temperature y.

12. The device for measuring or predicting temperature of claim 11, in which the valid time selecting unit comprises at least some of:

a derivation module configured for calculating one or more first-order derivatives and one or more second-order derivatives of the temperature data; and a first comparison module configured for:
comparing the one or more first-order derivatives and the second-order derivatives with a first value respectively; and
identifying the valid time period during which at least a first number of the one or more first-order derivatives is greater than or equal to the first value, and at least a second number of the one more second-order derivatives is smaller than or equal to the first value.

13. The device of claim 11, further comprising a preheating unit configured for heating the probe to a predetermined temperature, the preheating unit comprising at least some of:

a heating element configured for heating the probe;

an error calculating module of one or more first processing modules configured for calculating a difference between a current temperature value identified by the probe and the predetermined temperature;

a second comparison module of one or more first processing module configured for determining whether the difference meets an accuracy requirement; and a temperature control module of the one or more first processing modules configured for performing a process of adjusting an amount of heating for the probe based at least in part on a determination result or the second comparison module to control a temperature reading of the probe to reach the predetermined temperature, the process of adjusting comprises:

where an absolute value of the difference is smaller than a first preset value and greater than a second preset value, adjusting the amount of heating based at least in part on a control parameter determined via a third formula;

adjusting the amount of heating to 10%~90% of an original amount where the absolute value of the difference is greater than or equal to the first preset value; or fine tuning the amount of heating where the absolute value of the difference is smaller than or equal to the second value.

14. The device of claim 13, in which the third formula is defined as:

Error=coef 1*$P$+coef 2*$I$+coef 3*$D$, wherein

Error comprises the control parameter,

P comprises a proportion term representing the difference between the current temperature value and the predetermined temperature, I comprises an integral term representing an integral of the proportion term P over a period of time, and D comprises a term representing a first difference between a current proportion term and a pervious proportion term, and coef 1, coef 2, and coef 3 respectively comprise one or more empirical constants.

15. The device of claim 13, in which the one or more first processing modules comprise a general purpose processor, a special purpose processor, an application specific integrated circuit, or the one or more processing module.

16. The device of claim 11, in which the first formula is hyperbolic and is defined as:

$y=(a*t+b)/(t+c)$ where hyperbolic coefficients a, b, and c are determined by fitting the portion of the temperature data within the valid time period, and t represents time.

17. The device of claim 11, in which the second formula is hyperbolic and is defined as:

$y=(a*t+b)/(t+c)$ where hyperbolic coefficients a, b, and c are determined by fitting the portion of the temperature data within the valid time period, and t represents a time value taken at the second specific time point.

18. The device of claim 11, in which the one or more processing modules comprise a general purpose processor, a special purpose processor, or an application specific integrated circuit.

* * * * *